United States Patent Office

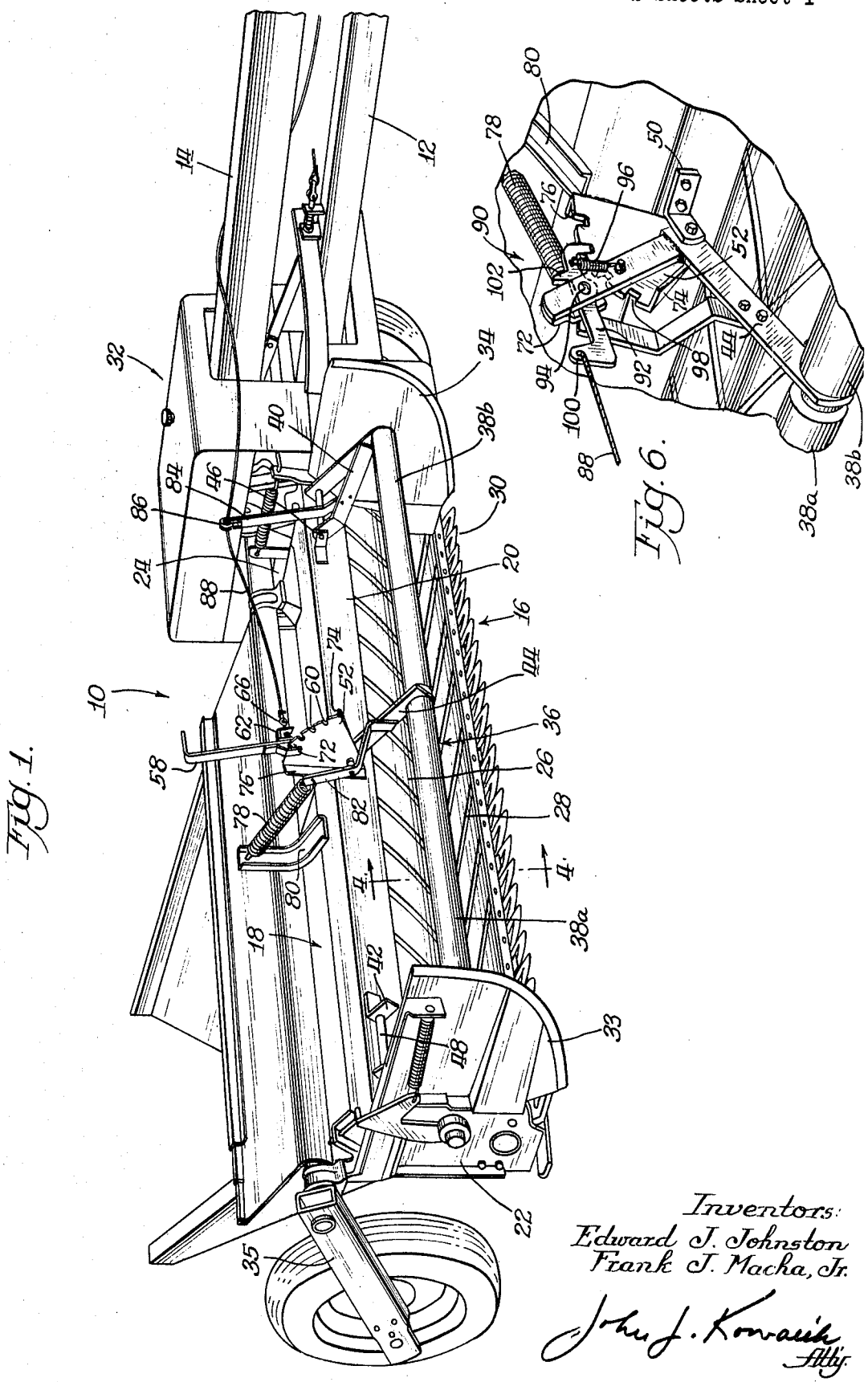

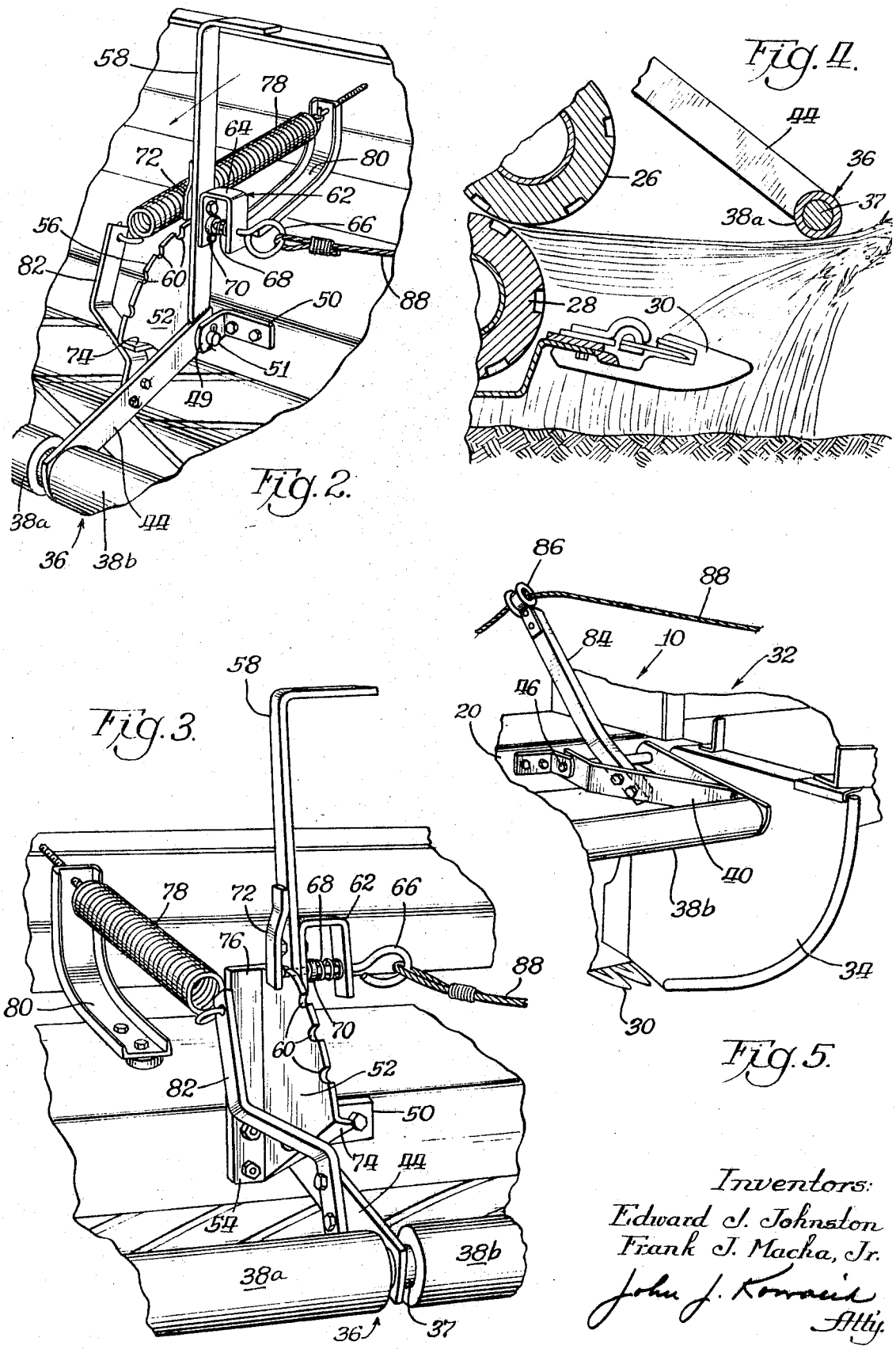

3,513,647
Patented May 26, 1970

3,513,647
FLICK BAR MECHANISM FOR HARVESTING APPARATUS
Edward J. Johnston, La Grange, and Frank J. Macha, Jr., Chicago, Ill., assignors to International Harvester Company, Chicago, Ill., a corporation of Delaware
Filed Aug. 15, 1967, Ser. No. 660,817
Int. Cl. A01d 43/00
U.S. Cl. 56—23                                                7 Claims

ABSTRACT OF THE DISCLOSURE

An adjustable flick bar mechanism which is used in conjunction with a harvesting machine. The flick bar can be manipulated by the driver of a tractor pulling the harvesting machine. Means are provided on the flick bar mechanism whereby the tractor driver may operate a lanyard from his driver's position to release the flick bar securing mechanism and position the flick bar in another desired position without leaving his seat.

---

This invention relates to a crop harvesting machine such as a mower-conditioner unit, and more particularly, to a fllick bar mechanism associated with such a unit.

Flick bars, sometimes referred to as lean bars, grain deflectors or prostrating bars, have been used in the past and are illustrated in U.S. Pats. 3,241,300 and 3,014,326. One of the problems encountered with flick bars results from the different height of the crops or grain to be mowed. To do an appropriate job of cutting the grain, it is desirable to provide a means for adjusting the height of the fllick bar in accordance with the varying height of the grain in the field. Such an adjustable flick bar is disclosed in International Harvester Company pending application for U.S. Pat. Ser. No. 439,588 filed on Mar. 15, 1965.

The invention herein disclosed provides a further improved flick bar mechanism in that the height of the flick bar above the ground may be adjusted by the driver of a vehicle, such as a tractor, drawing or pulling the mower-conditioner unit without the driver having to leave his seat on the vehicle. This invention provides means whereby the driver of the vehicle may release the flick bar from its secured position, and move the flick bar to a new selected position and secure it in place all without leaving his seat.

Accordingly, it is a principal object of the invention to provide means for adjusting the height of the flick bar associated with a crop harvesting machine which may be operated from a point remote from the unit such as by the driver of a tractor drawing the unit.

Another object is to provide means for releasably securing the flick bar in a plurality of positions, said securing means being releasable from a position remote from the flick bar mechanism.

Another object is to provide means for releasably securing a flick bar in a plurality of positions, biasing means for urging the flick bar in one direction to either its extreme high or low position and means for remotely controlling the height adjustment of the flick bar and moving it in the other direction to its extreme low or high position.

A more specific object of the invention is to provide a mechanism for lowering and elevating the flick bar comprising a notched latch sector mounted on the support framework and a spring-biased securing bolt or pin adapted to be selectively entered into any of a series of notches in the sector, the flick bar being spring-biased to its uppermost position and means being provided to apply a pulling force on the securing bolt in a direction disengaging the bolt from the sector and also to pull the bar downwardly against the spring resistance, the distance of pull on said means determining the position of the flick bar whereupon release of said means permits the bolt to reengage an adjacent slot before the return spring can act to raise the bar.

The above and other objects and features of the invention will be more readily apparent when read in conjunction with the accompanying drawings in which:

FIG. 1 is a view in perspective of a mower conditioner unit with which is associated a flick bar mechanism embodying the principles of the invention;

FIG. 2 is a view in perspective showing the flick bar releasable securing and positioning mechanism as viewed from the right side of FIG. 1;

FIG. 3 is a view in perspective showing the same mechanism as in FIG. 2 but viewed from the left side of FIG. 1;

FIG. 4 is an enlarged partial sectional view taken along the line 4—4 of FIG. 1 showing the flick bar in relation to the mower mechanism and upper and lower conditioning rolls;

FIG. 5 is an enlarged view in perspective showing a portion of the structure by which the flick bar may be positioned by the driver of an associated pulling vehicle;

FIG. 6 is a view similar to that of FIG. 3 but showing a modified form of releasable securing and positioning mechanism.

Referring now to the drawings, 10 designates generally a harvesting machine here shown as a mower-conditioner unit. It is adapted to be attached to and pulled by a tractor (not shown) through the tongue 12. A connecting drive shaft between the power take-off of the tractor and the harvesting machine 10 is disposed within the shield member 14 to drive the mechanism of the harvesting machine. A flick bar mechanism 16 is attached to the forward portion of the mower-conditioner spanning substantially the full width thereof.

The harvesting machine comprises generally a framework 18 which includes a transversely extending beam member 20, and end supporting members 22 and 24 between which are rotatably supported a pair of spaced conditioning rolls 26 and 28 and a mower mechanism 30. The beam member, conditioning rolls and mower mechanism all are disposed substantially parallel to each other and extend transversely to the direction of movement of the harvesting machine. The harvesting machine 10 also includes a drive unit 32 which is driven from the power take-off of the tractor pulling the harvesting machine, and the drive unit 32 in turn is operably connected to drive the conditioning rolls 26 and 28 and operate the mower mechanism 30. Side plates 33 and 34 are attached at each end of the mower-conditioner unit to assist in separating crops during cutting. An individual wheel suspension 35 is connected at one side of the harvesting machine. A harvesting machine of this type is described in greater detail in International Harvester Company pending application for U.S. Pat. Ser. No. 439,588 filed on Mar. 15, 1965 and further detailed description accordingly is not necessary.

The flick bar assembly 16 comprises a fllick bar 36 which includes a shaft 37 and a pair of rolls 38a and 38b rotatably mounted on the shaft 37. It also includes means for pivotally mounting the flick bar 36 on the beam member 20 by means of support arm members 40 and 42 attached to each end of the flick bar and arm member 44 attached to the shaft 37 substantially at its mid-point. The support arm members 40 and 42 are identical substantially right triangular shaped right and left bracket members.

The arm members 40 and 42 are pivotally secured to the beam member 20 by identical pivotal mountings 46 and 48, and arm member 44 is pivotally secured to the beam member 20 by pivotal mounting 49 which may comprise a bracket 50 secured to the beam member 20 and a pivot pin 51 extending through the bracket and arm 44.

The flick bar assembly 16 also includes means for positioning the flick bar at a plurality of different heights with respect to the ground to compensate for crops of different heights to be cut by the mower mechanism. This positioning means includes a segmental indexing plate member 52 secured to the beam member 20 by means of a flange member 54. The indexing plate member extends in a vertical plane normal to the flick bar and is positioned alongside support arm member 44. The lower portion of plate 52 also forms a part of the bearing support for the pivot pin 51, the latter extending through plate 52. The upper surface 56 of plate 52 is formed with a curvature described by a radius having its center at the pivot point for a lever arm member 58 which is fixed to the supporting arm member 44 and which coincides with the pivot point of the arm member 44. A plurality of spaced notches 60 are formed in the outer periphery of the plate member 52 to receive a securing pin as hereinafter described.

A securing device 62 is mounted on lever member 58. It comprises a substantially U-shaped bracket 64, one leg of which is secured to lever member 58 by suitable means such as by bolting or welding. A spring biased securing pin 66 extends through both legs of the bracket 64 and through lever member 58 to selectively engage one of the notches 60 in the indexing plate 52 depending on the position of the flick bar, the pin 66 and notches 60 being termed "detent means". A compression spring 68 surrounding the pin 66 between the legs of the U-shaped bracket bears against a flange 70 secured to the pin 66 to urge the pin into engagement with the notches. The pin, of course, is withdrawn from the notches by pulling it to the right as viewed in FIG. 2. This frees the lever member 58 for pivotal movement. A small bracket 72 is secured to lever member 58, and an offset portion thereof overlaps the indexing plate 52 to hold the lever member 58 adjacent to the plate 52.

It will be apparent that when the pin 66 is released and lever member 58 is pushed forwardly and downwardly in the direction of the arrow as viewed in FIG. 2, the flick bar 36 is moved to a lower position about its pivotal mountings 46, 48 and 49. The lower limit of movement of the flick bar 38 is controlled by a stop member 74 which is a flange portion of the indexing plate 52, positioned substantially at right angles thereto and with which the lever member 58 comes in contact to stop its further downward pivotal movement. The upper limit of the flick bar 36 is likewise controlled by a flange 76 at the rear edge of indexing plate 52 against which the bracket 72 strikes to limit the rearward movement of lever member 58.

In the embodiment disclosed herein the flick bar 36 in an unsecured position normally would be urged toward its uppermost position by a tension spring 78. One end of spring 78 is attached to one leg of an L-shaped bracket 80 which is in turn secured to beam member 20. The other end of spring 78 is attached to an upwardly extending arm 82 secured to arm member 44 and offset therefrom. The spring 78 is positioned closely adjacent the indexing plate 52, the arm 82 being offset an amount sufficient to accommodate the lateral spacing between the spring 78 and indexing plate 52.

At the right end of the flick bar assembly as shown in FIGS. 1 and 5, a lever arm 84 is fixedly attached to support arm member 40 for pivotal movement with the latter. The lever arm 84 extends rearwardly and upwardly from the arm member 40, preferably making an angle of approximately 40–50° therewith. An eye member 86 is attached to the upper end of lever arm 84 and is adapted to receive therethrough a cable or lanyard 88. The liner 84 and lanyard 88 serve as control means. This lanyard 88 is connected to pin 66 and is led through eye member 86 and up to the tractor drawing the harvesting machine so that the tractor driver may handle the lanyard from his driver's seat position. The eye member 86 could be replaced by a small pulley sufficient to let the lanyard run free therethrough.

It will be apparent that sufficient pull on the lanyard 88 will be effective first to pull the securing pin 66 out of engagement with the particular indexing plate notch 60 with which it is engaged at the time. This frees the flick bar mechanism for pivotal movement on the pivotal mountings 46, 48 and 49. Without any additional pull on the lanyard 88, the tendency will be for the flick bar mechanism to pivot upwardly in response to the tension of spring 78. The spring 78, of course, is much stronger than the spring 68. Additional pull on the lanyard 88, however, will move the lever arm 84 forwardly and downwardly and pivot the flick bar 36 to a lower position against the tension of spring 78. Thus the pull on the cable will initially release securing pin 66 and thereupon the force will be applied to lever arm 84 against the resistance of tension spring 88. When the flick bar has been moved to the approximate desired position, the operator reduces the pull on the lanyard. The compression on the spring 68 associated with the pin 66 is thereby reduced and the pin 66 is free to reengage a notch 60. The large tension spring 78, of course, will move the flick bar in an upwardly direction until the pin 66 is free to engage the first notch 60 it encounters in the indexing plate.

FIG. 4 illustrates the action of the flick bar 36. It will be observed that the flick bar is positioned ahead of the rollers and ahead of the mower mechanism 30. As the mower-conditioner unit moves to the right, the flick bar 36 bends the crops before their lower portion comes in contact with the blades of the mower mechanism. When they are cut, the inherent springiness in the cut crops makes the cut ends spring upwardly, thereby being neatly guided into the rotating conditioning rolls 26 and 28. The height of the flick bar with respect to the crops obviously has an effect on how efficiently crops are fed between the conditioning rolls. Since the height of crops in a field may vary substantially for a variety of reasons, it becomes particularly appropriate to have a flick bar positioned at as nearly an optimum height as possible in order to achieve an efficient means of feeding the cut crops into the conditioning rolls. Ease in adjusting the position of the flick bar contributes to this efficiency.

A modified form of securing device 90 is shown in FIG. 6. With this arrangement the lever arm 84 is not necessary and the lanyard 88 would be connected directly to the securing device. Thus a direct pull on the lanyard attached to the securing device is used to release the secured device and change the position of the flick bar.

The securing arrangement 90 comprises a latch arm 92 pivotally mounted on the lever arm 58 by means of a pivot pin 94 to cause the latch arm to pivot generally in the plane of the indexing plate 52. A biasing spring 96 is provided for normally urging the free end of the latch arm 92 into engagement with one of the notches 98 in the plate 52. The biasing spring 96, as here shown, may be a tension spring connected between the underside of latch arm 92 and the lever arm 58 effective to pull the latch arm downwardly into engagement with the notches 98. When utilizing this embodiment, the notches 98 may be shaped to accommodate the end of latch arm 92 or such other portion thereof as might engage the notches 98. The lanyard 88 is attached to the upper portion of the latch arm at 100. Suitable stop means may be provided on the latch arm, so as to limit the movement of the latch arm 92 once it has been disengaged from the notches. This is necessary, so that further pull on the lanyard will be effective to exert a force which is effective to move the flick bar 36 downwardly against the force of tension spring 78. Such means may comprise a stop 102 on the latch arm which strikes the lever 58 after disengagement of the latch arm 92 from one of the notches. Thus, further pull on the lanyard is effective to exert a force on the lever 58 to pivot the flick bar assembly in a downward direction. Release of the lanyard obviously permits the latch arm 92 to reengage one of the notches 98 to again secure the flick bar in a desired position.

It will thus be apparent that I have advantageously provided a simple, quick and efficient means of adjusting the position of a flick bar associated with a crop harvesting machine from a remote position. The means I have provided permits a tractor driver to quickly raise or lower a flick bar, depending on crop requirements, without leaving the driver's seat. He needs no wrenches or other equipment to loosen bolts or make other manual adjustments. By manipulation of the lanyard, he can release the securing mechanism, move the flick bar to the desired position, and releasing the lanyard will permit the flick bar to be resecured in position.

While the particular embodiment disclosed herein contemplates a tension spring 78 for urging the flick bar toward a relatively higher position and a pull on the lanyard by the tractor operator to bring the flick bar to a lower position, it will be appreciated that the scope of this invention contemplates other arrangements. These may include an arrangement whereby a compression spring is mounted to normally urge the flick bar to a relatively higher position. It might also include an arrangement, for example, wherein the force of gravity is utilized to lower the flick bar mechanism counterbalanced by a spring force and the driver's remote control by a pull on a cable to raise the flick bar mechanism.

I claim:
1. In a harvesting machine the combination comprising:
   a transversely extending crop engaging bar;
   means for mounting said bar on the harvesting machine for movement between a plurality of vertically displaced operating positions;
   means compriing detent means connected between the machine and bar for selectively positioning and securing said bar in selected vertically displaced positions;
   means operatively associated with said detent means for releasing and resetting the same with attendant change of position of said bar; and
   control means for operating said resetting and release means from a remote position.
2. In a harvesting machine the combination comprising:
   a transversely extending crop-engaging bar assembly;
   means for pivotally mounting said bar assembly on the harvesting machine;
   means for selectively positioning and securing said bar assembly in a plurality of positions;
   means operatively associated with said bar assembly for releasing said securing means from a position remote therefrom, and said means for selectively positioning and securing said bar assembly comprises an index plate attached to the harvesting machine and releasable means associated with said bar assembly for securing the bar assembly to said index plate.
3. The combination of claim 2 including:
   biasing means for normally urging said bar assembly to a predetermined position when said securing means is released.
4. In a harvesting machine the combination comprising:
   a transversely extending crop-engaging bar assembly;
   means for pivotally mounting said bar assembly on the harvesting machine;
   means for selectively positioning and securing said bar assembly in a plurality of positions;
   means operatively associated with said bar assembly for releasing said securing means from a position remote therefrom;
   biasing means for normally urging said bar assembly to a predetermined position when said securing means is released,
   and said biasing means is a tension spring operatively connected between said bar assembly and the harvesting machine.
5. The combination of claim 4 wherein:
   said means for releasing said securing means includes a lanyard attached to said securing means, the latter being releasable by a pull on said lanyard from a position remote from the harvesting machine.
6. In a harvesting machine the combination comprising:
   a transversely extending crop-engaging bar assembly;
   means for pivotally mounting said bar assembly on the harvesting machine;
   means for selectively positioning and securing said bar assembly in a plurality of positions;
   means operatively associated with said bar assembly for releasing said securing means from a position remote therefrom, and including biasing means for normally urging said bar assembly to a predetermined position when said securing means is released;
   lever means attached to one end of said bar assembly;
   lanyard means connected to said securing means and operatively associated with said lever means whereby a pull on said lanyard means is effective to exert a force on said lever means and effect a change of position of said bar assembly.
7. The combination of claim 6 including:
   means associated with the said lever for retaining and guiding said lanyard means and disposed in a location whereby said lanyard is effective first to release said securing means and then is effective to exert a force on said lever means to effect a change of position of said bar assembly.

References Cited

UNITED STATES PATENTS 2,609,650   9/1952   Lindquist _____ 56—23

ROBERT PESHOCK, Primary Examiner